United States Patent [19]

Moore

[11] Patent Number: 5,087,474
[45] Date of Patent: Feb. 11, 1992

[54] FEED SUPPLEMENT FATS FROM ABATOIR SLUDGE

[75] Inventor: William P. Moore, Hopewell, Va.

[73] Assignee: Harmony Products, Inc., Chesapeake, Va.

[21] Appl. No.: 665,094

[22] Filed: Mar. 6, 1991

[51] Int. Cl.$^5$ ............................................. A23K 1/10
[52] U.S. Cl. .................................. 426/646; 426/285;
426/335; 426/518; 426/520; 426/532; 426/623;
426/630; 426/641; 426/807
[58] Field of Search ............... 426/623, 641, 285, 646,
426/807, 69, 520, 518, 630, 96, 335, 532

[56] References Cited

U.S. PATENT DOCUMENTS

| | | | |
|---|---|---|---|
| 3,615,651 | 10/1971 | Parks | 426/641 |
| 4,361,590 | 11/1982 | Wojcik | 426/480 |
| 4,565,709 | 1/1986 | Berge et al. | 426/641 |
| 4,593,614 | 6/1986 | Berge et al. | 426/641 |
| 5,021,077 | 6/1991 | Moore | 426/285 |

OTHER PUBLICATIONS

W. S. Galler and C. B. Davey, "High Rate of Poultry Manure Composting with Sawdust", Proceedings, International Symposium on Livestock Wastes, Apr. 19-22, 1971, Columbus, Ohio.

Primary Examiner—R. B. Penland

[57] ABSTRACT

A stepwise method of recovering high integrity particulate feed supplement fats free of live pathogens and malodors from abatoir sludge containing substantial fat components in a vacuum evaporating granulator. The method comprises: primary comminuting aqueous abatoir sludge with strong base until a fluid suspension of finely divided particles is formed; evaporatively heating the suspension until the dry matter amounts to more than 70 percent and the strong base has reacted with the fat component and coagulated the fluid suspension to form soft homogeneous solid agglomerates; secondary comminuting the agglomerates with high speed blades until particles are formed with diameters smaller than 5 millimeters; and setting the particles by heating under vacuum until the particles harden, exhibit no malodors, and are free of live pathogens. A chemical agent such as phosphoric acid or uncondensed urea-formaldehyde concentrate may be additively reacted with the abatoir sludge to ameliorate odors and pathogens. A fat source suitable for inclusion in the feed rations for ruminants and monogastric animals is provided by the instant method. Mixtures of abatoir sludges or abatoir sludge admixed with animal feeds may be used in the method.

11 Claims, No Drawings

FEED SUPPLEMENT FATS FROM ABATOIR SLUDGE

FIELD OF THE INVENTION

The present invention relates to animal feed supplements; and more particularly is directed to a method of recovering particulate animal feed fats, free of malodors and pathogens from abatoir by-products and to the product recovered by this method.

BACKGROUND OF THE INVENTION

The production of commercial animals for human food by abatoirs is one of the worlds largest industries. Less than one-half of the live weight of the commercial animals are consumed by humans with the remainder left for disposal. Many of the abatoir by-products and wastes still contain potentially valuable materials, but at present are either discharged into water or onto land. This can cause unsightly landscapes, health hazards, malodorous atmospheres, and pollution of land and water.

Progress has been significant in the recovery of proteinaceous animal wastes and by-products, and in their utilization as pet food, animal feed, protein, supplements, and nitrogen fertilizers. In my U.S. Pat. No. 5,021,077, a method is provided for the preparation of natural nitrogenous granules. However, there has been little progress provided in the area of recovery of fats as granular products which may be used effectively as supplements for commercial animal feeds.

Fats are one of the most important ingredients in commercial animal by-products, and are usually the largest constituent in the sludges collected from abatoir waste water treatment operations. These fats represent large potential values if there were efficient methods available for their recovery in useful forms. Unfortunately, at the present time, fat constitutes a serious sensory and pollution problem because it is not usefully recovered, but rapidly putrefies, creating malodors and supporting growth of pathogens which cause health hazards.

At the present time, rendering by boiling or steaming is the prime method used if fats are recovered from abatoir operations. Rendering is unable to provide free-flowing, high integrity particulate fats free of malodors and pathogens. Rendering, by definition, melts the fats into a liquid, but in actual practice, usually produces a soft malodorous semisolid which is difficult to handle, blend, or use.

To maintain clean and sanitary conditions in abatoir operating areas, the areas are washed with water frequently, or continuously. The wash water is usually quickly, or continuously, removed from the operating area and sent to an effluent water treatment plant. There the insoluble solids are separated as sludges from the effluent water. These aqueous sludges, including those which float and those which settle in water, usually contain between 5 and 50 percent fat on a dry basis, and are typical of the fats now wasted which cause pollution problems. Although the sludge generation techniques vary somewhat, depending on the individual operations and the type animals being produced, the aqueous sludges which contain fat are essentially the same.

High fat abatoir sludges are usually generated in slaughterhouses; however, mortality frequently occurs in commercially produced animals in areas outside those desired. For example, as animals, particularly poultry, are grown and maintained, an inevitable mortality rate occurs. This rate amounts to between 5 and 7 percent of the poultry raised, for many and varied causes. Disposal of these animals has been to date a very difficult task which created hazards of disease spread to other animals, and which could cause damage to various parts of the environment.

A recently developed method for handling this animal mortality problem, comminutes these animals into a fluid which is pumped into a treatment tank where it is maintained at a low pH, usually created by microbial action, to pickle the solids, prevent putrefaction, and to provide a stabilized abatoir sludge for subsequent periodic collection and disposal. These aqueous pickled sludges typically contain 30 to 50 percent dry matter which comprises between 10 and 40 percent fat. The art has provided no method for recovering fat values from those abatoir sludges as malodor and pathogen free animal feed supplement particles.

Another abatoir sludge source of fats is the residue from hatching eggs. This sludge may be recovered by washing and water treatment or by simple mechanical collection, and may comprise egg mortality, egg residue after hatching, and chick mortality. The sludges from hatcheries typically contain between 40 and 60 percent dry matter comprising about 10 to 30 percent fat on an as is basis. No satisfactory method for recovery of the fats contained in this abatoir sludge as malodor and pathogen free animal feed supplement particles has been provided by the art.

Composting has been used for the disposal of some of the animal by-products, but its effectiveness with high fat wastes, such as the abatoir sludges, has been limited. While composting usually slowly rids the area of malodors, it dilutes the by-products, increases the volume to be eventually disposed of into the environment, and eliminates any values of fat which might have been recovered as an animal feed supplement.

Typical composting technique is described by W. S. Galler and C. B. Davey in their paper entitled "High Rate of Poultry Manure Composting With Sawdust", published in the Proceedings, International Symposium On Livestock Wastes, Apr. 19-22, 1971, Columbus, Ohio.

A review of the literature provides no method for recovering particulate animal feed fats free of malodors and pathogens from abatoir sludges.

OBJECTS OF THE INVENTION

A primary object of the present invention is to provide a method of recovering feed supplement fats, free of pathogens and malodors, from abatoir sludges.

A further object of the present invention is to provide a free flowing, high integrity animal feed supplement particulate fat product, free of pathogens and malodors prepared from abatoir sludge.

SUMMARY OF THE INVENTION

The method of the present invention involves the stepwise recovery of feed supplement fats, free of pathogens and malodors, from abatoir sludge in an evaporating reactor. It was found that the first necessary step is a primary comminuting of aqueous abatoir sludge with a strong base until a fluid suspension containing very fine fat particles is formed. In the second step, it is necessary to heat while evaporating until most of the water is removed and the strong base has chemically reacted with the fat and coagulated the fluid into soft homogeneous solid agglomerates. In the third step, the agglomerates must be comminuted to particles of about the size useful as animal feed supplements, and finally, in the fourth step, it is necessary to set the particles into granules by heating them under vacuum and elevated temperature until the particles are dry, hard, and free of malodors, and pathogens. Each of the four steps are necessary and it is required that the steps be carried out in the particular sequence discovered.

It was discovered that the particulate feed supplement fat product prepared by the instant method was a new source of feed supplements for monogastric and ruminant animals which were free-flowing, readily handled in feed supplement equipment and supplied fat effectively as feed supplements to monogastric and ruminant animals with fat concentrations between 10 and 50 percent on a dry basis.

DESCRIPTION OF THE PREFERRED EMBODIMENT

I have discovered a four step method whereby feed supplement fats can e recovered free of pathogens and malodors from abatoir sludges in an evaporating reactor; and that each of the four steps must be carried out in the closely controlled conditions discovered to achieve the desirable new product found. The four steps required are: primary comminuting of abatoir sludge, evaporating and heating the comminuted sludge, secondary comminuting the heated sludge, and setting the sludge after the secondary comminuting. It is necessary to carry out the method in a cylindrical evaporating granulator which contains blades rotating at a speed between 20 and 80 feet per second along and tangential to a heated and stationary inside wall of the cylindrical evaporating granulator. It was found necessary that the blades rotate close enough to the inside wall to continuously scrape the wall.

To achieve the very difficult granulation of the fat product, it is necessary that each of the four steps be carried out carefully in the newly discovered manner defined as (1) Primary comminuting is performed on abatoir sludge containing between about 10 and 50 percent fat on a dry basis along with strong, base amounting to between 1 and 10 percent of the abatoir sludge on a dry basis to provide a pH between 8 and 14. It is necessary to the achievement of high integrity granules that the sludge and base be comminuted until more than 90 percent of the particles are smaller than 1 millimeter in diameter, and it was found that the evaporating granulator produced effective granules only when the fluid suspension during the primary comminuting step contained between 10 and 60 percent dry matter.

Strong bases effective in the primary comminuting step are sodium hydroxide, potassium hydroxide, calcium hydroxide, magnesium hydroxide, calcium carbonate, sodium carbonate, potassium carbonate, and sodium bicarbonate.

(2) Evaporation and heating the primary comminuted fluid suspension is necessary at a temperature between about 55° and 120° C. until the dry matter amounts to more than 70 percent and the strong base has reacted with the fat components of the fluid suspension and coagulated it to form soft homogeneous solid agglomerates. While heat was necessary to achieve the desired fat-base reaction, without the evaporation no suitable agglomerates were developed for subsequent conversion to high integrity granules.

(3) Secondary comminuting the soft homogeneous agglomerates is required until particles are formed from the agglomerates which have diameters between 0.5 and 5.0 millimeters.

(4) The secondary comminuted particles are set by heating under vacuum, at absolute pressures between 0.02 and 0.50 atmospheres with absolute temperatures between 70° and 110° C., until the dry matter in the particles amounts to between 90.0 and 99.5 percent and the particles exhibit high integrity and no malodors or live pathogens. The low pressure evaporation was to provide the drying necessary to set the granules into hardened high integrity granules at temperatures low enough to cause no damage to the food value and palatability of the fat in the animal feed supplements. The vacuum operation at low absolute pressures also fractured pathogen cells present in the final granules.

As a method for additional granule safety, it was discovered that chemical agents could be comminuted with the aqueous abatoir sludge in the primary comminuting stage of the process to kill pathogens present in the abatoir sludge and provide addtional safety to the recovered high integrity particles of feed supplement fats. The chemical agents found effective are: formaldehyde, urea-formaldehyde concentrate, calcium hypochlorite, methylolurea, nitric acid, and phosphoric acid. The urea-formaldehyde concentrates contain between 50 and 85 percent dry matter and formaldehyde to urea molecular ratios between 3 and 6 to 1 and are uncondensed.

It was found that the method of this invention can be carried out in a more economical manner when: the abatoir sludge contains between 20 and 50 percent fat on a dry basis; the dry matter of the fluid suspension amounts to between 25 and 50 percent; the fluid suspension is heated to a temperature between 60° and 85° C.; and the dry matter in the homogeneous solid agglomerates amounts to between 75 and 85 percent. Operation within these limits provided economic throughputs without damage to the feeding value or palatability of the granular products.

It was also found that the apparatus used for carrying out the method of this invention was free of clogging, and required minimum clean-outs when the homogeneous solid agglomerates are secondary comminuted to form particles with diameters between 0.5 and 5.0 millimeters by means of chopper blades rotating perpendicular to, and between, the rotating scraping blades and the inside wall of the cylindrical evaporating granulator at a linear speed between 1 and 10 times the speed of the scraping rotating blades, and where the diameter of the chopper blades amounted to between about 2 and 15 percent of the inside diameter of the evaporating granulating cylinder. The operation of the chopper blades in this manner was particularly effective in producing granular products having a closely controlled size range.

When the total time for the four steps of the instant invention was held between 10 and 100 minutes, it was found that high integrity granules were produced which could be readily handled without formation of dusts, and the food value and palatability of the animal feed supplement fats were not impaired.

When the four required steps are carried out in a contiguous continuous manner, the economics of the method were found to be maximized. By contiguous continuous, it is indicated that the materials continuously flow in from the first stage through the fourth stage without intermediate holdups or transport to separated pieces of equipment.

The method of this invention allows the recovery of high integrity particles of feed supplement fats from a variety of abatoir sludges. Sludge effectively recovered include: poultry abatoir washdown solids, swine abatoir washdown solids, cattle abatoir washdown solids, sheep abatoir washdown solids, shredded whole dead poultry, and poultry hatchery waste solids. These solids or sludges are collected as wastes usually by gravity separations from aqueous fluids discharged from operations where dead commercial animals are processed.

Evaluations showed that the high integrity granules recovered from abatoir sludges by the four step method of this invention were free of live pathogens and malodors, and were effective animal feed supplement fats. The product was found to be unique in that the granules were homogeneous, nearly spherical and unlike feed supplements prepared by other methods of the art.

In the most preferred operation of the instant invention, a four step method is used to recover high integrity particles of feed supplement fats free of live pathogens and malodors from poultry abatoir sludge by a primary comminuting, evaporatively heating, a secondary comminuting, and setting in a stationary cylindrical evaporating granulator. The granulator contains mixing elements mounted to a central rotating shaft which throws contained materials toward the center of the cylindrical evaporating granulator, forcing axial and radial flows simultaneously on contained materials, creating thereby a mechanically fluidized bed of contained materials. The fluidization is assisted by an upward flow of air through the fluidized materials at a linear velocity between 0.8 and 2.0 feet per second. The stationary cylindrical evaporating granulator is most effective when it is equipped with an independently driven chopper mounted in the side wall of the cylinder to control the size of particles formed.

The most preferred conditions found for each of the four steps to provide optimum product integrity and maximum operating effectiveness of the method are listed as follows:

(1) The primary comminuting is done with aqueous abatoir sludge containing fat components amounting to between 20 and 50 percent and between 0.5 and 2.0 percent methylolurea, with between 2 and 4 percent alkali metal hydroxide to provide a pH between 10 and 12. The primary comminuting is continued until a fluid suspension is formed containing comminuted sludge particles more than 90 percent of which are smaller in diameter than 1 millimeter. The fluid suspension preferably contains dry matter amounting to between 25 and 50 percent.

(2) The fluid suspension is then evaporatingly heated to a temperature between 60° and 85° C. until the dry matter amounts to between 75 and 85 percent and the strong base has reacted with the fat components to coagulate the fluid suspension to form soft homogeneous agglomerates.

(3) The agglomerates are then secondary comminuted until particles are formed from the agglomerates having diameters between 0.5 and 2.0 millimeters.

(4) The particles are then set by heating under vacuum at absolute pressures between 0.02 and 0.50 atmospheres at temperatures between 70° and 110° C. until the dry matter in the particles exhibit high physical integrity and no live pathogens or malodors.

The high integrity particulate feed supplement fat products, free of live pathogens and malodors, recovered from poultry abatoir sludge by this most preferred four step method, were unique and effective animal feed fats supplements.

It was found that the method of this invention was effective for recovering high integrity particles of feed supplement fats from a single abatoir waste, a mixture of abatoir wastes, or a mixture of abatoir waste or wastes with other animal feeds or feed supplement ingredients so long as the conditions required for operability of the method are maintained.

A blend of poultry abatoir wash water sludge, sludge composed of comminuted whole dead poultry, and hatchery waste sludge contained the requisite 10 to 50 percent fat content and was effectively converted to high integrity particles when put through the four step method of this invention.

In a similar operation, animal feeds including corn gluten meal, wheat middlings, soybean meal, cottonseed meal, fish meal, poultry fecal waste, distillers grain, and bonemeal, were combined with abatoir sludges to contain the required 10 to 50 percent fat content, and also effectively converted to live pathogen free feed supplement fats which were effectively consumed by commercial animals including poultry, cattle, and swine.

The terms used in this disclosure are briefly defined as follows:

fats—determined by the method of the American Association of Feed Control Officials, and defined as obtained from tissues of mammals and or poultry. It consists predominately of glyceride esters of fatty acids.

abatoir—a place handling dead commercial animals.

set—harden to a integral piece not easily deformed by applied force and resistant to attrition.

evaporating granulator a device for removal of water from its contents by evaporation while simultaneously mechanically forming its contents into granules.

solid agglomerate—a cluster of solids packed together in a coherent mass.

mortality—commercial animals inadvertently dying in the period between conception and harvesting.

MODE OF OPERATION OF THE INVENTION

Having described the basic concepts of the instant invention, reference is now made to the following examples which are provided to illustrate the invention's methods of recovering high integrity particles of feed supplement fats and the efficacy of these particles.

EXAMPLE 1

This example demonstrates the method of this invention for recovering sludge from poultry abatoir waste water as high integrity feed supplement fat particles.

A steam jacketed Littleford FM-130 Mixer was used as a horizontal stationary cylindrical evaporating granulator in this example. The mixer contained two mixing elements affixed to a central shaft rotating at a peripheral speed of 725 feet per minute, with each mixing element arranged to throw the cylinder contents toward the center of the evaporating granulator and force axial and radial flows simultaneously on the materials contained in the cylinder, thereby creating a mechanically fluidized bed of the contained materials. The mechanical fluidization was improved and particle size was controlled by a single three-bladed 6 inch diameter blade chopper turning tangential to, and 6 inches inside of the wall toward the center of the cylinder. The chopper blades operated between the two mixing elements at a blade peripheral speed of 5400 feet per minute. Fluidization was improved further by applying air through the bottom wall of the horizontal cylinder to produce an upward linear air flow rate of about 1 foot per second.

High fat abatoir sludge was collected from a waste water treatment plant of a large commercial poultry kill plant in North Carolina. The sludge contained solids which floated on the waste water and were collected by skimming. It also contained solids which were removed by settling and by filtration from the waste water. The sludges were drained centrifugally of excess water and combined. The waste water resulted primarily from wash downs of the areas where poultry was slaughtered, and contained finely divided poultry flesh, skin, viscera, and fecal material.

Abatoir sludge amounting to 80 lbs. was charged to the evaporating granulator. The sludge contained 60 percent moisture as charged. Dry basis analysis made on the sludge is listed as follows:

| Ingredient | Wt % |
|---|---|
| Fat | 42.0 |
| Protein | 29.4 |
| Phosphorous | 1.1 |
| Sulfur | 0.2 |

Also charged to the evaporating granulator was 1.5 pounds of aqueous methylolurea, produced with a four to one formaldehyde to urea ratio. The pH of the aqueous mixture was brought to 10.5 by adding 2.5 pounds sodium hydroxide as a 50 percent aqueous solution.

Primary comminuting was done by operating the horizontal cylindrical Littleford Mixer with the choppers until a fluid suspension was formed containing very finely divided matter, which completely passed through a sieve with 1 millimeter openings. The dry matter of the fluid suspension was found to be 41.2%.

The fluid suspension was then evaporatingly heated to a temperature of 70° C. at an absolute pressure between 0.4 and 0.6 atmospheres. Water was evaporated to increase the dry matter of the cylinder contents to 76% and the sodium hydroxide was reacted with the fat components of the sludge to coagulate the fluid suspension and soft homogeneous agglomerates was formed.

Secondary comminuting was performed on the soft agglomerates by continuing to operate the Littleford Mixer with its chopper until the agglomerates were converted to particles having diameters in the size range between 0.7 and 1.5 millimeters.

The sized particles were then set by rapidly drying them under vacuum at an absolute pressure of 0.2 atmosphere and a temperature of 81° C. until the dry matter increased to 98.1%.

The particles recovered had high integrity, were free of malodors, resistant to attrition, free flowing and were found to be free of any live microbes, including pathogens.

The granules were analyzed for nutrients and the results are tabulated as follows:

| Ingredients | Wt % |
|---|---|
| Fat | 56.0 |
| Protein | 39.1 |
| Phosphorous | 1.5 |
| Sulfur | 0.3 |

EXAMPLE 2

This example demonstrates the method of this invention for recovery of shredded whole dead chickens as feed supplement fat particles.

Using the equipment described in Example 1, 130 pounds of pickled shredded dead chickens were charged to the evaporating granulator as a semisolid containing 60 percent moisture with the analysis listed as follows:

| Ingredients | Wt, % (dry basis) |
|---|---|
| Fat | 37.2 |
| Protein | 26.2 |
| Phosphorous | 1.6 |

Also added to the reactor-granulator of Example 1 was 3.0 pounds of calcium carbonate, 6.0 pounds of sodium hydroxide beads, and 1.2 pounds of uncondensed urea-formaldehyde concentrate containing 65 percent solids and a formaldehyde to urea mol ratio of 5.2 to 1.

The four steps used in Example 1 were carried out with the sized particles set, after neutralizing with 4.0 pounds of 85% phosphoric acid, by drying the particles under vacuum at a temperature of 86° C. at an absolute pressure of 0.15 atmospheres until the dry matter amounted to 92.0%.

The particles recovered were free of malodors, and live pathogens.

EXAMPLE 3

This example demonstrates that the abatoir sludges may be mixed with other animal feeds to produce desirable animal feed supplement fats.

In the reactor-granulator of Example 1, 130 pounds of the pickled shredded chickens used in Example 2 was charged. In addition, 20 pounds of corn gluten meal containing 92% dry matter was added to the shredded chickens.

To the mixture was added 12 pounds of 50% sodium hydroxide, 2.0 pounds magnesium oxide and 1.0 pounds of 20% aqueous sodium hypochlorite. The four steps of Example 1 were carried out with the sized particles neutralized to a pH of 6.8 by adding phosphoric acid, and set at a temperature of 72° C. at an absolute pressure of 0.18 atmospheres until the dry matter of the particles amounted to 91.1%. The particles recovered were free flowing, emitted a pleasant odor, and were free of live pathogens.

EXAMPLE 4

This example demonstrates the efficacy of the feed supplement fats prepared from abatoir sludge by the method of the instant invention.

A 21 day battery feed trial was arranged in which 300 chicks were fed a standard broiler high growth formula, and 300 chicks were fed the same feed having the same nutrient content, with 5 percent of the feed derived via Example 2 from poultry mortality. At the end of the 21 day period, average body weight gain of the chickens and the percent mortality were measured and tabulated as follows:

|  | Ave. Body Weight Gain, lbs | % Mortality |
|---|---|---|
| Control | 1.203 | 1.7 |
| Control with 5%, Example 2 | 1.216 | 1.7 |

In the isonutrition feed tests, the feed containing 5% of the fat supplement produced from deceased poultry performed as well as, or better than, the feeds using only virgin fats.

I claim:

1. A stepwise method of recovering high integrity particles of feed supplement fats free of pathogens and malodors from abatoir sludge by a primary comminuting, evaporatively heating, second comminuting, and setting in a cylindrical evaporating granulator containing blades scrapingly rotating at a speed between 20 and 80 feet per second along and tangential to a heated stationary inside wall of the cylindrical evaporating granulator, the steps of the method comprising:
   (a) primary comminuting aqueous abatoir sludge, containing between about 10 and 50 percent fat on a dry basis, with between 1 and 10 percent strong base selected from the group consisting of sodium hydroxide, potassium hydroxide, calcium hydroxide, magnesium hydroxide, calcium carbonate, sodium carbonate, potassium carbonate, and sodium bicarbonate, to provide a pH between 8 and 14, until a fluid suspension is formed comprising comminuted sludge particles more than 90 percent of which exhibit diameters smaller than 1 millimeter, the fluid suspension containing dry matter amounting to between 10 and 60 percent;
   (b) evaporatively heating the fluid suspension to a temperature between about 55° and 120° C. until the dry matter amounts to more than 70 percent and the strong base has reacted with fat components to coagulate the fluid suspension to form soft homogeneous solid agglomerates;
   (c) secondary comminuting the agglomerates until particles are formed which exhibit diameters between 0.5 and 5.0 millimeters;
   (d) setting the particles by heating at pressures between 0.02 and 0.5 atmospheres absolute at temperatures between 70° and 110° C. until the dry matter in the particles amounts to between 90.0 and 99.5 percent and the particles exhibit high physical integrity and no malodors or live pathogens.

2. The method of claim 1 wherein one or more chemical agents selected from the group consisting of formaldehyde, urea-formaldehyde concentrate, calcium hypochlorite, sodium hypochlorite, methylolurea, nitric acid and phosphoric acid, are comminuted with the aqueous abatoir sludge to kill pathogens present in the abatoir sludge and provide additional safety to the recovered high integrity particles of feed supplement fats.

3. The method of claim 1 wherein the abatoir sludge contains fat amounting to between 20 and 50 percent on a dry basis, the dry matter of the fluid suspension amounts to between 25 and 50 percent, the fluid suspension is heated to a temperature between 60° and 85° C., and the dry matter in the homogeneous solid agglomerates amounts to between 75 and 85 percent.

4. The method of claim 1 wherein the homogeneous solid agglomerates are secondary comminuted to form particles exhibiting diameters between 0.5 and 2.0 millimeters by means of chopper blades rotating perpendicular to, and between, the scrapingly rotating blades and the inside wall of the cylindrical evaporating granulator at a linear speed between 1 and 10 times that of the scrapingly rotating blades, the diameter of the chopper blades amounting to between about 2 and 15 percent of the inside diameter of the evaporating granulator cylinder.

5. The method of claim 1 wherein the total time for the primary comminuting, evaporatingly heating, secondary comminuting and setting steps amounts to between 10 and 100 minutes.

6. The method of claim 1 wherein the primary comminuting, evaporatingly heating, second comminuting, and setting steps are carried out in a contiguous, continuous manner.

7. The method of claim 1 wherein high integrity particles of feed supplement fats are recovered from one or more abatoir sludges selected from the group consisting of poultry abatoir washdown solids, swine abatoir washdown solids, cattle abatoir washdown solids, sheep abatoir washdown solids, shredded whole dead poultry, and poultry hatchery waste solids.

8. The method of claim 1 wherein the abatoir sludge comprises a plurality of sludges which contains between 10 and 50 percent fat on a dry basis.

9. The method of claim 1 wherein the abatoir sludge is admixed with other animal feeds selected from the group consisting of corn gluten meal, wheat middlings, soybean meal, cottonseed meal, fish meal, poultry fecal waste, distillers grain, and bone meal to form a mixture which contains between 10 and 50 percent fat on a dry basis.

10. High integrity particulate feed supplement fat product, free of live pathogens and malodors, recovered from abatoir sludge by the method of claim 1.

11. A four step method of recovering high integrity particles of feed supplement fats free of live pathogens and malodors from poultry abatoir sludge by a primary comminuting, evaporatively heating, a secondary comminuting, and setting in a horizontal stationary cylindrical evaporating granulator containing mixing elements affixed to a central rotating shaft which throws contained materials toward the center of the cylindrical evaporating granulator, forcing axial and radial flows simultaneously on contained materials, creating a mechanically fluidized bed of contained materials, the fluidization being assisted by an upward flow of air through the fluidized materials at a linear velocity between 0.8 and 2.0 feet per second, the stationary cylindrical evaporating granulator being equipped with an independently driven chopper mounted in the side wall of the cylinder to control size of particles formed, the steps of the method comprising:
   (a) primary comminuting aqueous abatoir sludge, containing fat components amounting to between 20 and 50 percent on a dry basis, and between 0.5 and 2.0 percent methylolurea, with between 2 and 4 percent alkali metal hydroxide strong base to provide a pH between 10 and 12 until a fluid suspension is formed comprising comminuted sludge particles more than 90 percent of which exhibit diameters smaller than 1 millimeter, the fluid suspension containing dry matter amounting to between 25 and 50 percent;

(b) evaporatingly heating the fluid suspension to a temperature between 60° and 85° C. until the dry matter amounts to between 75 and 85 percent and the strong base has reacted with the fat components to coagulate the fluid suspension to form soft homogeneous agglomerates;

(c) secondary comminuting the agglomerates until particles exhibiting diameters between 0.5 and 2.0 millimeters are formed from the agglomerates;

(d) setting the particles by heating at pressures between 0.02 and 0.5 atmospheres absolute at temperatures between 70° and 110° C. until the dry matter in the particles amounts to between 95 and 99 percent and the particles exhibit high physical integrity and no malodors or pathogens.

* * * * *